July 31, 1928.

W. M. MORRISON

FILTERING DEVICE

Filed Feb. 17, 1927

INVENTOR.
William M. Morrison
BY Albert M. Austin
ATTORNEYS.

July 31, 1928.
W. M. MORRISON
FILTERING DEVICE
Filed Feb. 17, 1927
1,678,704
2 Sheets-Sheet 2
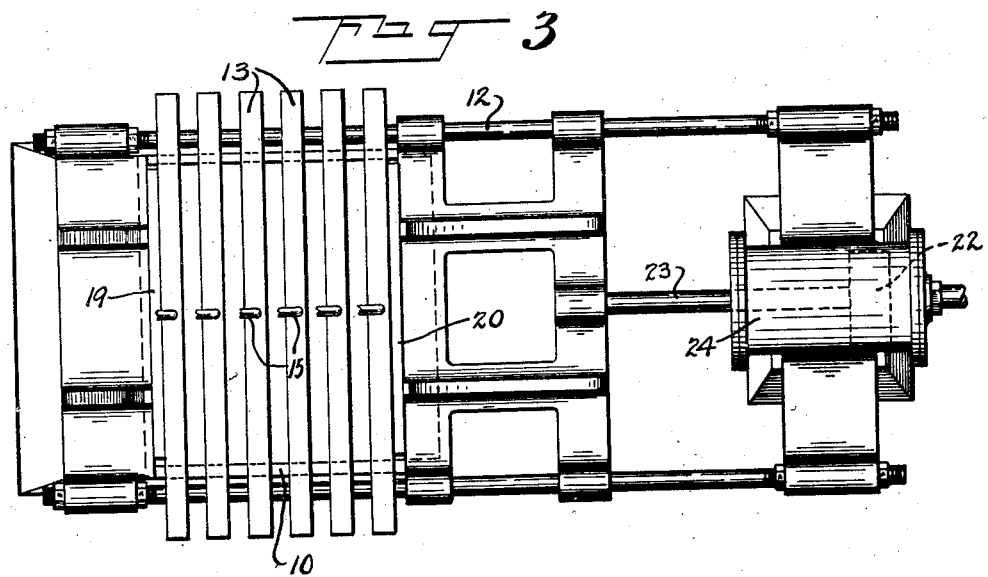
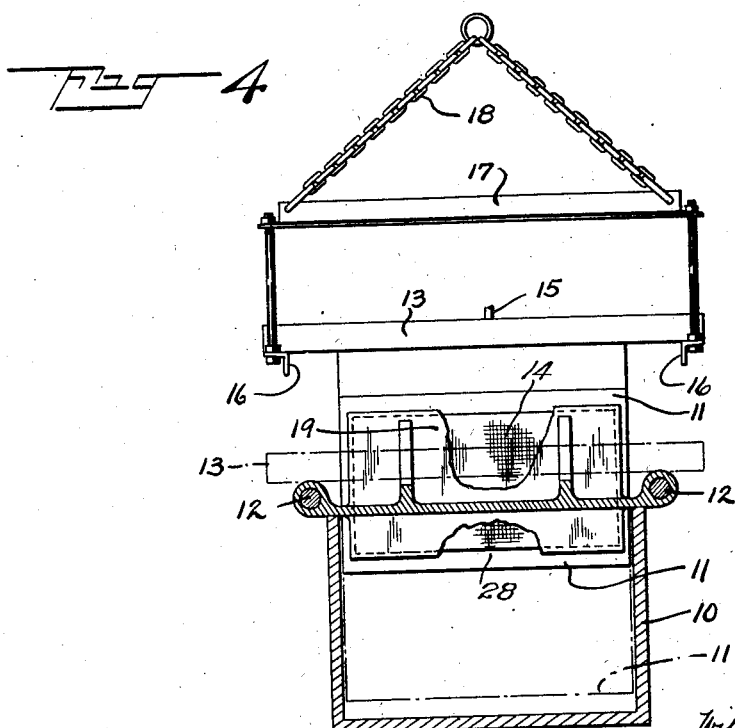
INVENTOR.
William M. Morrison
BY Albert M. Austin
ATTORNEYS.

Patented July 31, 1928.

1,678,704

UNITED STATES PATENT OFFICE.

WILLIAM M. MORRISON, OF TACOMA, WASHINGTON, ASSIGNOR TO AMERICAN SMELTING AND REFINING COMPANY, OF NEW YORK, N. Y., A CORPORATION OF NEW JERSEY.

FILTERING DEVICE.

Application filed February 17, 1927. Serial No. 168,872.

This invention relates to filters, and more particularly, to filters for extracting solids from a solution by the use of both vacuum and mechanical pressure.

The invention relates more specifically to a filter capable of extracting metal slimes from an electrolyte and of forming them into solid, substantially moisture-free cakes.

In accordance with this invention, a filter may be constructed with a plurality of plates, each having two filter-surfaces separated by suitable means to provide a closure from which air may be exhausted as by a vacuum pump. When the air is exhausted from the interior of the filter-plates, the deposition of solid materials thereon is hastened and a comparatively solid cake may be formed in the spaces between adjacent plates. The assembly is then adapted to be removed from the liquid and placed under mechanical pressure while the vacuum is maintained, the combination of pressure and vacuum serving to remove the remaining liquid from the cakes and to produce a comparatively dry mass. The dried and compressed cakes may then be separated from the filter-plates by a simple manual operation and the process repeated.

Although the novel features which are believed to be characteristic of this invention will be pointed out with particularity in the claims appended hereto, the invention itself, as to its objects and advantages, the mode of its operation and the manner of its organization may be better understood by referring to the following description taken in connection with the accompanying drawings forming a part thereof, in which Fig. 1 is a side elevation of a filter constructed in accordance with this invention, with the plates immersed;

Fig. 3 is a plan view of the filter assembly; and,

Fig. 4 is an end elevation thereof, partly in section.

Like reference characters denote like parts in the several figures of the drawings.

Figure 1:
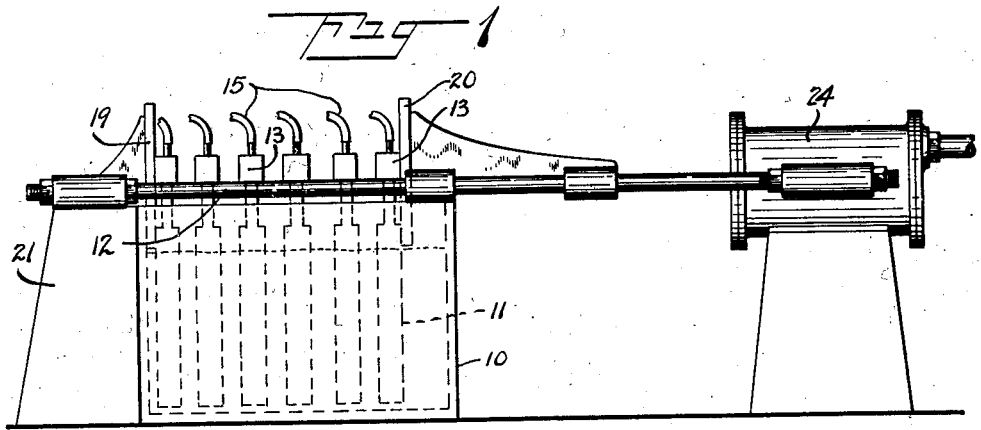
Figure 2:
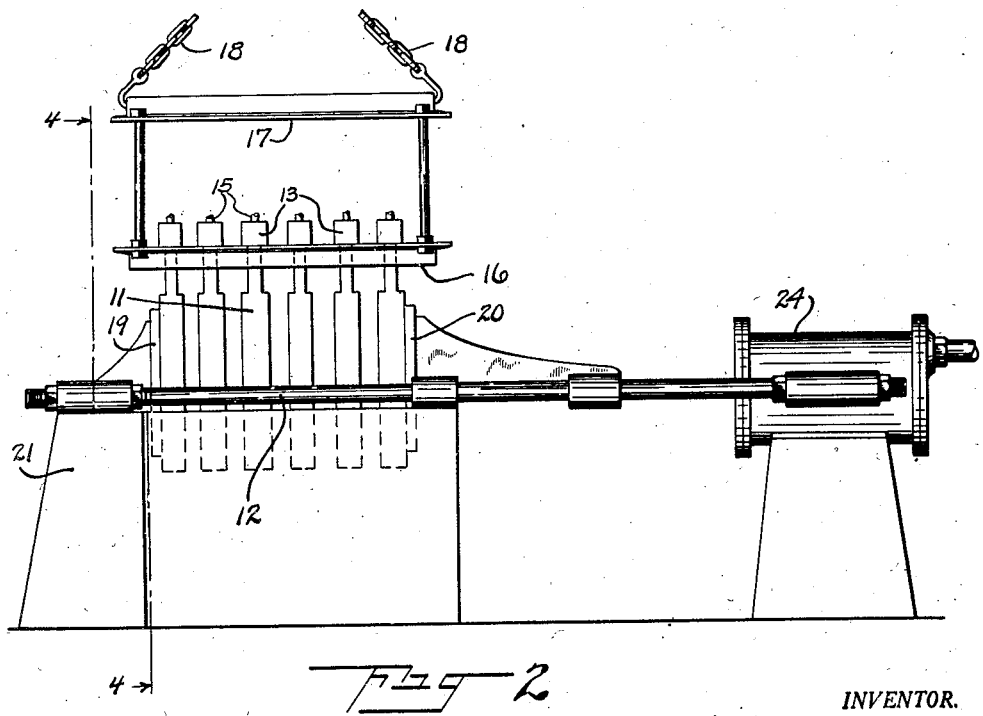
Fig. 2 is a side elevation of the arrangement shown in Fig. 1, with the plates in raised position.

In the following description and in the claims parts will be identified by specific names for convenience, but they are intended to be as generic in their application to similar parts as the art will permit.

Referring to the drawings more in detail, one form of filter constructed in accordance with this invention comprises a container 10 in which filter-plates 11 may be inserted, the plates being supported on rods 12 by means of hangers 13.

Filter-plates 11 may be of any suitable construction such as a pair of filter-surfaces 14 separated by a solid rectangular framework 28 to form a substantially closed assembly from which air may be withdrawn through flexible pipes 15 connected to a vacuum pump (not shown). The particular type of filter-plate employed, however, forms no part of the present invention.

A series of filter-plates 11, separated so as to provide spaces for the formation of a cake between adjacent surfaces thereof, are inserted in container 10 and immersed in the solution therein contained.

The air may be exhausted from the interior of filter-plates 11 during the filtering process to facilitate the deposition of the solid particles upon the surface of the plates. The process is preferably continued until the solid particles form a cake substantially filling the spaces between adjacent filter-plates.

After the formation of the cakes has progressed to the desired point, and while maintaining a reduced air pressure within the plates, the assembly may be raised from the solution as by means of a rack 16 suitably supported from a frame 17. Frame 17 may be raised by suitable means such as chain 18, which may be connected to a suitable hoist (not shown), or may be manually operated, as desired. The assembly is raised to such a position that the surfaces of filter-plates 11 lie between stationary-head 19 and movable-head, or ram, 20.

The stationary-head 19 may be suitably supported as by standard 21, and may form a portion of the end wall of container 10. Movable head, or ram, 20 may be slidably mounted on rods 12 and operated by piston 22, to which it is connected by connecting-rod 23. Piston 22 is slidable in cylinder 24, and may be operated therein by suitable means such as steam or water pressure. Rods 12 may be supported by standard 21 and by cylinder 24, thereby forming a rigid connection between stationary-head 19 and said cylinder.

After the filter-plates have been raised to the position in which their surfaces align with stationary-head 19 and ram 20, pressure may be applied by piston 22 so as to force ram 20 against the surface of the adjacent filter-plate. A reduced air pressure may be maintained in the interior of the various plates by continuing the suction through the pipe 15, while mechanical pressure is being applied to the surface of the cakes. The combination of reduced air pressure and high mechanical pressure tends to extract the remaining liquid from the cakes formed between the surfaces of filter-plates 11 and to produce a comparatively dry mass. After the desired consistency has been reached, the cakes may be readily removed, as by slightly separating the filter-plates. Since the plates are loosely supported on rack 16, they may be readily separated a sufficient distance to release the dried cakes without disassembling the apparatus. As soon as the cakes have been removed, the filter-plates are therefore in condition to be re-inserted in the container for further use, without the delay usually incident in re-assembling.

By means of the above described apparatus, not only is a much drier cake obtained than would be possible were either vacuum or pressure applied singly, but the time required to remove the dried cake and re-condition the apparatus for subsequent operations is reduced to a minimum.

The apparatus is particularly applicable for the removal of copper slimes from an electrolyte remaining after the electrodeposition of copper and is capable of forming the slimes into substantially dry cakes suitable for subsequent use. It is not limited to this specific use, however, but may be employed generally for the separation of solid precipitates from a solution.

In the drawings accompanying and forming part of this specification, a practical commercial embodiment of the invention is disclosed, but as such illustration is primarily for purposes of disclosure, it will be understood that the structure may be modified in various respects without departure from the broad spirit and scope of the invention as hereinafter defined and claimed.

What is claimed is:

1. A filter comprising a container having a solution to be filtered therein, a plurality of filter-plates, each of said plates comprising a pair of filter-surfaces separated to form a closure, means for applying a vacuum to said closure while said plates are immersed in said solution, whereby a cake may be formed in the spaces between adjacent plates, means for raising said plates from said solution, and means for applying mechanical pressure to said assembly in raised position while maintaining said vacuum, whereby a substantially dry, solid cake may be obtained.

2. A filter comprising a container adapted to receive a solution to be filtered, a stationary-head carried by said container above said solution, a pair of rods supported by said container, a movable-head slidable on said rods, hydraulic means for moving said head, a plurality of filter-plates arranged in stacked relationship and supported by said rods, each of said plates comprising a pair of filter-surfaces suitably separated to form a closure, means for reducing the air pressure within said closures, and means for raising said plates above said solution and into alignment with said stationary and movable heads whereby pressure may be applied thereto while said vacuum is being maintained.

3. A filter comprising a container, a plurality of filter-plates therein, means for reducing the pressure within said plates whereby the solid materials may be deposited upon the surface thereof to form a cake, means for raising said plates from said container, means for applying mechanical pressure thereto while maintaining said reduced air pressure whereby the moisture is removed from said cakes, and means for separating said filter-plates to facilitate the removal of said cakes therefrom when said pressure is relieved.

4. A filter comprising a container, a plurality of filter plates therein arranged in parallel stacked relationship, means for reducing the pressure within said plates whereby solid materials may be deposited upon the surfaces thereof to form a cake, means for raising said plates from said container, and means for applying mechanical pressure to the stack whereby the filter cakes are compressed therebetween while maintaining the reduced pressure within said plates whereby moisture may be eliminated from said cakes.

5. A filter comprising a container, a plurality of filter plates, means for supporting said filter plates therein in stacked relationship, means for reducing the pressure within said plates whereby solid materials may be deposited upon the surface thereof and caused to substantially fill the space between adjacent plates, means for raising said plates from said container, and means for simultaneously applying mechanical pressure transversely of said plates to squeeze the cakes therebetween and maintaining the reduced pressure within said plates.

In testimony whereof I have hereunto set my hand.

WILLIAM M. MORRISON.